Aug. 6, 1957 J. R. NYE 2,802,180
CORONA DETECTOR
Filed July 7, 1953
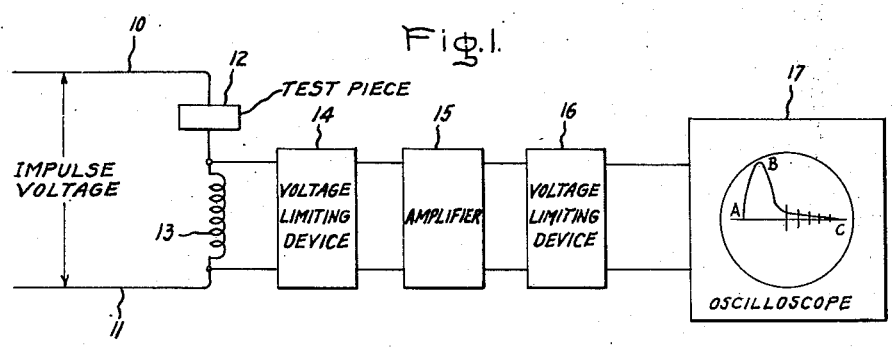
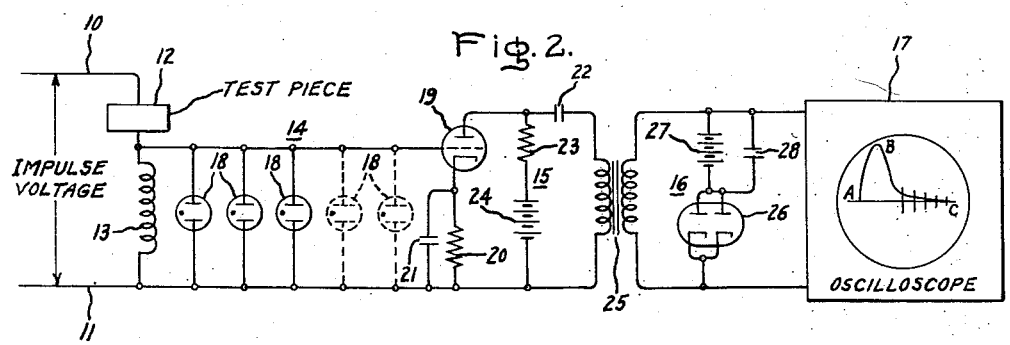
Inventor:
James R. Nye,
by Gilbert P. Tarleton
His Attorney.

United States Patent Office 2,802,180
Patented Aug. 6, 1957

2,802,180

CORONA DETECTOR

James R. Nye, Pittsfield, Mass., assignor to General Electric Company, a corporation of New York Application July 7, 1953, Serial No. 366,488

5 Claims. (Cl. 324—72)

This invention relates to apparatus for detecting corona and particularly to apparatus for detecting impulse corona.

In recent years the shortening of capacitor life due to corona in the dielectric material has been the subject of considerable study and a number of improvements in capacitors have been produced as a result of this study. A great deal of time has been devoted to the development of apparatus for measuring corona-starting voltage. As described in American Institute of Electrical Engineers Technical Paper 51–306, the first approach to the problem of measuring 60-cycle corona voltage was to balance out the normal 60-cycle charging current, and observe what was left. In the early apparatus, which was developed about 1935, a Schering bridge was used, with its output at the detector terminals fed through a broad-band amplifier into a standard magnetic type oscillograph. As developed over the next few years, the Schering bridge circuit was modified, an improved broad-band amplifier was used in the circuit, and a cathode ray oscilloscope was substituted for the magnetic oscillograph. This apparatus could measure corona currents of the order of $6 \times 10^{-6}$ amperes. Subsequently, chokes were added to smooth the applied voltage wave and a high-pass filter added to the measuring circuit. Later, the choke coil was changed to a low-pass filter. In a further improvement, a high voltage capacitor was added in parallel with the test capacitor and series measuring inductance.

When the voltage applied to any of the above-described apparatus consists of a 60-cycle sinusoidal wave, the separation of the corona voltage from the normal charging voltage is comparatively easy. In this case, both voltages are applied to the medium-band corona amplifier which is designed to respond only to frequencies of 10,000 cycles per second and higher. Only the high-frequency corona voltage is amplified, therefore, and applied to the cathode-ray oscilloscope. The 60-cycle voltage is rejected and the corona appears as vertical lines (i. e. high-frequency damped transient-signals compressed in time) on the face of the cathode ray oscilloscope.

When the voltage applied to the device under test consists of a series of high frequency impulses rather than a sinusoidal wave of low frequency, the detection circuits described above are not satsifactory. Although the amplifier will separate the corona voltage from the charging voltage on the slowly-changing portion of the wave, the oscilloscope picture of this separation is obliterated by the appearance on the oscilloscope of the very large charging voltage developed on the rapidly-changing portion of the wave for the reason that this charging voltage is also of high frequency and is passed by the amplifier.

It is an object of the present invention to provide a corona detector which will not only measure corona in a test piece subjected to sinusoidal low frequency voltage but also high frequency impulse voltage.

It is another object of the invention to provide apparatus which will separate impulse corona from impulse voltage and enable the impulse corona to be measured.

In accordance with one of its aspects, the above stated objects of the invention are accomplished by apparatus comprising an inductance, a circuit connecting the inductance in series with a test piece, means for applying a charging impulse voltage to the circuit, a first voltage-limiting device connected across the inductance, an amplifier connected across the inductance, a second voltage-limiting device connected to the output of the amplifier, and means for indicating corona discharges in the portion of the charging voltage emerging from the output of the second voltage-limiting device.

The drawing comprises Fig. 1 which shows, partly in block form, an embodiment of the invention; and Fig. 2, which is similar to Fig. 1 except that it provides additional circuit details.

Referring to Fig. 1, a circuit for impressing an impulse charging voltage on a test piece comprises a pair of lead wires 10 and 11 connecting the test piece 12 in series with a pick-up means, such as inductance 13, for detecting any voltage developed across the test piece. A first voltage limiting device 14 connected across the inductance 13 limits the amplitude of the charging voltage preferably to about 70 volts. The signal voltage thus limited is passed through an amplifier 15 which has its output connected to a second voltage limiting device 16 which is biased positively to effect maximum clipping action on the large charging voltage without affecting the smaller corona pulses formed in an unclipped portion of this voltage. The output of the voltage limiting device 16 is connected to an instrument which will measure the magnitude of this voltage. A preferred instrument for this purpose is shown as a cathode-ray oscilloscope 17.

The voltage limiting devices 14 and 16 may be any of a number of well known components used as voltage-limiting devices. Two such devices will be discussed with reference to Fig. 2. The amplifier 15 may be any of a variety well known to those skilled in the art for high frequency use and may consist of several stages. Where several stages are used a voltage-limiting device may be used in conjunction with each stage. There are many models of cathode ray oscilloscope available on the market and the oscilloscope 17 may be one of these conventional models. Accordingly, no schematic circuit is given for the oscilloscope 17.

Referring to Fig. 2, the first voltage limiting device 14 is seen to consist of a number of gaseous discharge tubes 18 connected in parallel across the pick-up inductance 13. The gaseous discharge tubes 18 may be ordinary neon tubes which become conducting when the voltage exceeds a particular level.

The clipped signal limited in amplitude by the tubes 18 is impressed upon the control electrode of a triode 19 of the amplifier 15. The amplifier 15 illustrated in Fig. 2 consists of a rather rudimentary circuit including a grid bias resistor 20, bypass capacitor 21, coupling capacitor 22, resistor 23, and battery 24. It is to be emphasized that more complex multi-stage amplifiers may be used in place of the amplifier 15. The amplifier 15 is inductively coupled by means of a coupling transformer 25 to the second voltage limiting device, or clipper, here shown as a twin vacuum diode of the type designated 6H6. The entire circuit of the second voltage limiting device 16 consists of the diode 26 and a biasing battery 27 with its bypassing capacitor 28. The 6H6 diode becomes conducting to some extent when any positive voltage is applied to its plates. Hence, it will clip to a great extent the positive portion of the charging voltage appearing at that point and the small corona pulses will be passed unattenuated with that portion of the charging voltage which is applied to the cathode-ray oscilloscope. Without the positive bias a smaller portion of the charging voltage wave would be clipped. Although the optimum value of the bias voltage depends upon the applied voltage, the magnitude of the corona being measured, and the position of the corona on the voltage trace, a value of 4.5 volts has been found to be generally satisfactory. While voltage limiting devices other than those described may be used, the two illustrated and described represent the preferred form of the invention.

The trace shown on oscilloscope 17 of Fig. 2 is typical for a test piece subjected to impulse voltage. Various portions of the trace have been designated A, B, and C for purposes of identification. The clipped impulse charging voltage is represented by A—B—C and the corona voltage by the vertical lines at the trailing end of the B—C portion of the trace. While corona voltages are generated during the A—B portion of the charging pulse their effect is obliterated by the voltage limiting devices 14 and 16 clipping the high voltage portions thereof where these corona voltages occurred. In view of the long decay time of the charging pulse with respect to its buildup time, a relatively long time base is required to adequately show the decay and its accompanying corona pulses. Thus, the main portion of the charging pulse occurs with a relatively narrow base and a somewhat rounded top portion. This rounded effect could, of course, be eliminated by decreasing the sweep time of the oscilloscope, but would result in cutting off the greater part of the decay portion B—C of the trace.

It is the discovery that when serious corona occurs under impulse conditions, the corona pulses form not only on the rapidly changing portion A—B of the wave, but also on a relatively slowly changing portion B—C of the wave that enables the invention to detect impulse corona voltages.

Thus, it can be seen that the principle employed in the invention is to reduce the magnitude of the charging voltage so that corona in the portion B—C of the trace can be observed on the cathode ray oscilloscope. The device of the invention has been successfully applied to the problem of detecting corona in pulse-forming radar networks at an impulse repetition rate of 2,000 per second.

Referring to Fig. 2, let it be assumed that an impulse charging voltage is applied to the test piece 12, which may be a capacitor. Impulse corona voltages are reflected in the pick-up inductance 13. The tubes 18 are desirably arranged to limit the amplitude of any signal voltage impressed upon the control electrode of the triode 19 to 70 volts. The amplifier 15 then amplifies this clipped signal and passes it on to the twin diode 26 through the coupling transformer 25. The twin diode 26 further reduces the amplitude of this clipped signal of the charging voltage without interfering with the corona discharge voltage on its trailing end portion which is applied to the oscilloscope 17. As a result of this action the portion B—C of the oscilloscope trace is used to disclose and provide an accurate indication of the presence of impulse corona voltage.

While the present invention has been described with reference to particular embodiments thereof, it will be understood that numerous modifications may be made by those skilled in the art without actually departing from the invention. Therefore, I aim in the appended claims to cover all such equivalent variations as come within the true spirit and scope of the foregoing disclosure.

What I claim as new and desire to secure by Letters Patent of the United States is:

1. Apparatus for detecting corona discharges comprising means for applying a corona producing impulse voltage to a test piece, a pick-up inductance connected in series with said test piece, a first clipping means connected across said inductance, said first clipping means limiting the potential passing therethrough, an amplifier connected to said inductance and across said first clipping means, a second clipping means connected to the output of said amplifier, said second clipping means also limiting the potential passing therethrough and in combination with said first clipping means and said amplifier limiting the potential of said impulse voltage passing therethrough to values disclosing corona discharge voltages in the end portion of said impulse voltage, and means for indicating corona discharges in said end portion of said impulse voltage emerging from said second clipping means.

2. Apparatus for detecting corona discharges comprising an inductance, a circuit connecting said inductance in series with a test piece, means for applying a corona producing impulse voltage to said circuit, a first voltage limiting device connected across said inductance, an amplifier connected to the output of said first voltage limiting device, a second voltage limiting device connected to the output of said amplifier, and a cathode-ray oscilloscope connected to the output of said second voltage limiting device, said voltage limiting devices and said amplifier in combination applying to said oscilloscope that portion of the trailing end of said impulse voltage which is of a magnitude to disclose the presence of corona discharge voltages therein when observed on said oscilloscope.

3. Apparatus for detecting corona discharges comprising an inductance, a circuit connecting said inductance in series with a test piece, means for applying a corona producing impulse voltage to said circuit, a plurality of voltage limiting gaseous discharge tubes connected in parallel across said inductance, an amplifier connected to the output of said gaseous discharge tubes, a voltage limiting device connected to the output of said amplifier, and a cathode-ray oscilloscope connected to the output of said voltage limiting device, said voltage limiting tubes and device and said amplifier in combination applying to said oscilloscope that portion of the trailing end of said impulse voltage which is of a magnitude to disclose the presence of corona discharge voltages therein when observed on said oscilloscope.

4. Apparatus for detecting corona discharges comprising an inductance, a circuit connecting said inductance in series with a test piece, means for applying a corona producing impulse voltage to said circuit, a plurality of voltage limiting gaseous discharge tubes connected in parallel across said inductance, an amplifier having its input connected across said inductance and said voltage limiting gaseous discharge tubes, a voltage limiting diode connected across the output of said amplifier and biased positively to increase its voltage limiting action on the output of said amplifier without affecting the voltages of the corona discharges in said output, and a cathode-ray oscilloscope connected to the output of said amplifier and across said voltage limiting diode.

5. Apparatus for detecting corona discharges comprising means for applying a corona producing impulse voltage to a test piece, pick-up means for detecting any voltage developed across said test piece, a first voltage limiting device connected across said pick-up means, amplifier means connected to the output of said first voltage limiting device, a second voltage limiting device connected to the output of said amplifier, said voltage limiting devices and said amplifier in combination limiting the output voltage from said second voltage limiting device to voltages of the magnitude of the trailing end portion of said impulse voltage, and means for indicating corona discharge voltages in the output voltage from said second voltage limiting device.

References Cited in the file of this patent
UNITED STATES PATENTS 2,539,971   Potjer _____ Jan. 30, 1951

OTHER REFERENCES

"Corona Test Equipment for Solid Dielectric Cables," article in Electronic Industries of May 1948, pp. 14–15.